United States Patent
Hiller

(10) Patent No.: US 10,302,865 B1
(45) Date of Patent: May 28, 2019

(54) REMOTE OPTICAL AMPLIFIERS POWERED BY SCATTERED LIGHT

(71) Applicant: The Boeing Company, Chicago, IL (US)

(72) Inventor: Nathan D. Hiller, Irving, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/849,391

(22) Filed: Dec. 20, 2017

(51) Int. Cl.
| | |
|---|---|
| *G02B 6/255* | (2006.01) |
| *H02S 40/34* | (2014.01) |
| *G02B 6/02* | (2006.01) |
| *H01S 3/067* | (2006.01) |

(52) U.S. Cl.
CPC ......... *G02B 6/255* (2013.01); *G02B 6/02295* (2013.01); *H01S 3/067* (2013.01); *H02S 40/34* (2014.12)

(58) Field of Classification Search
None
See application file for complete search history.

(56) References Cited

U.S. PATENT DOCUMENTS

| | | | | |
|---|---|---|---|---|
| 10,009,119 | B1 * | 6/2018 | Hiller | ............... H04B 13/02 |
| 2008/0135081 | A1 * | 6/2008 | Sharifi | ............... B64C 1/40 |
| | | | | 136/207 |
| 2009/0314333 | A1 * | 12/2009 | Shepard | ............... G02B 6/04 |
| | | | | 136/248 |
| 2011/0232211 | A1 * | 9/2011 | Farahi | ............... B32B 5/022 |
| | | | | 52/173.3 |
| 2013/0298956 | A1 * | 11/2013 | Hiller | ............... B64D 41/00 |
| | | | | 136/212 |
| 2015/0241302 | A1 * | 8/2015 | von der Weid | ...... H04B 10/071 |
| | | | | 356/73.1 |
| 2016/0341921 | A1 * | 11/2016 | Belansky | ............... H02J 50/30 |

* cited by examiner

Primary Examiner — Tina M Wong
(74) Attorney, Agent, or Firm — Duft & Bornsen, PC

(57) ABSTRACT

Optical fibers are described that include integrated Photovoltaic (PV) cells. The PV cells do not interfere with the optical signals that are transmitted along a core of an optical fiber. Further, the PV cells are able to convert light scattered from the core of the optical fiber into electricity. The PV cells may then be used to power remote optical amplifiers disposed along the optical fiber. For instance, the PV cells may be used to supplement or fully power the remote optical amplifiers. In one implementation, an apparatus includes an optical fiber and a PV cell. The optical fiber includes a first length and a second length that that are joined together at a splice. The optical fiber includes a core that conveys light, an inner cladding surrounding the core that is optically transparent, and an outer cladding surrounding the inner cladding that redirects scattered light from the core into the inner cladding. The PV cell is disposed at the splice between the first length and the second length of the optical fiber and includes a void that allows light from the core to traverse across the splice.

18 Claims, 8 Drawing Sheets

REMOTE OPTICAL AMPLIFIERS POWERED BY SCATTERED LIGHT

FIELD

This disclosure relates to the field of optical data transmission over optical fibers.

BACKGROUND

An optical fiber is a flexible transparent fiber typically formed from silica, plastic, or a polymer. Optical fibers are used in fiber optic communications, where they convey optical signals between ends of the optical fibers. Optical fibers include a core material that conveys the optical signals, which is surrounded by a transparent cladding. The transparent cladding has a lower index of refraction than the core, which keeps the optical signals mostly confined to the core due to total internal reflection. However, some of the optical signals in the core scatter from the core and are absorbed by a protective material that surrounds the optical fiber.

While silica is mostly transparent to optical wavelengths, some attenuation still occurs. This attenuation is also dependent on the wavelength of the optical signal. Thus, the optical power of the optical signal along the optical fiber decreases as a distance from the transmitting end of the optical fiber increases. If the optical power at the receiving end of the optical fiber is too low, then the optical signal may not be recovered correctly due to bit errors arising from a low signal-to-noise ratio.

To solve this problem, the optical signal may be amplified using an Erbium Doped Fiber Amplifier (EDFA). EDFAs utilize an active optical fiber that is placed in-line somewhere along the length of the optical fiber. The active optical fiber has an Erbium doped core, which is pumped by a laser diode from one or both ends of the optical fiber. The pump light from the laser diode(s) excite the Erbium ions in the doped core, which amplify the optical signals. The remote pumping of an optical amplifier is referred to as a Remote Optically Pumped Amplifier (ROPA).

Typically, the pump light has a wavelength of about 980 nanometers (nm), while the optical signal through a core of an optical fiber has a wavelength of about 1550 nm. 1550 nm is typically used for optical fibers that use silica as a core material, because the attenuation in silica at 1550 nm is lower than at other wavelengths.

One problem with ROPAs is that the attenuation coefficient of silica at 850 nm is much higher than the attenuation coefficient at 1550 nm. When the pump light is conveyed from an end of the optical fiber, the ROPAs have to be relatively close to the end that is providing the pump light in order to maintain a sufficient pump power at the active optical fiber. This limits how far from the end of the optical fiber that the ROPA can be placed, which can limit the length of the optical fiber before the optical signal degrades past the point of recovery. It is therefore desirable to provide other means of amplifying optical signals in an optical fiber that can extend the effective length of the optical fiber before amplification is required.

SUMMARY

Optical fibers are described that include integrated Photovoltaic (PV) cells. The PV cells do not interfere with the optical signals that are conveyed along a core of an optical fiber. Further, the PV cells are able to convert light scattered from the core of the optical fiber into electricity. The PV cells may then be used to power remote optical amplifiers disposed along the optical fiber. For instance, the PV cells may be used to supplement or fully power the remote optical amplifiers.

One embodiment comprises an apparatus that includes an optical fiber and a Photovoltaic (PV) cell. The optical fiber includes a first length and a second length that that are joined together at a splice. The optical fiber includes a core that conveys light, an inner cladding surrounding the core that is optically transparent, and an outer cladding surrounding the inner cladding that redirects scattered light from the core into the inner cladding. The PV cell is disposed at the splice between the first length and the second length of the optical fiber that includes a void that allows the light through the core to traverse across the splice.

Another embodiment comprises a method of integrating a PV cell into an optical fiber. The method comprises acquiring an optical fiber having a core that is configured to convey light, an inner cladding surrounding the core that is optically transparent, and an outer cladding surrounding the inner cladding that redirects scattered light from the core into the inner cladding. The method further comprises cleaving the optical fiber transversely to form a first length and a second length, and fabricating a PV cell onto an end of the first length of optical fiber, where the PV cell includes a void that allows the light through the core to traverse across the splice. The method further comprises splicing the end of the first length of the optical fiber to an end of the second length of the optical fiber.

Another embodiment comprises an apparatus that includes a first length of an optical fiber, a second length of an optical fiber, and a photon converter. The first length of the optical fiber has a first core that conveys light, a first inner cladding surrounding the first core that is optically transparent, and a first outer cladding surrounding the first inner cladding that is redirects scattered light from the first core into the first inner cladding. The second length of the optical fiber has a second core that is configured to convey the light, a second inner cladding surrounding the second core that that is optically transparent, and a second outer cladding surrounding the second inner cladding that is configured to redirect the scattered light from the second core into the second inner cladding, where the first core and the second core are joined together at a splice. The photon converter is sandwiched between the first inner cladding and the second inner cladding at the splice, converts the scattered light into electricity, and allows the light from the first core to traverse across the splice to the second core.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
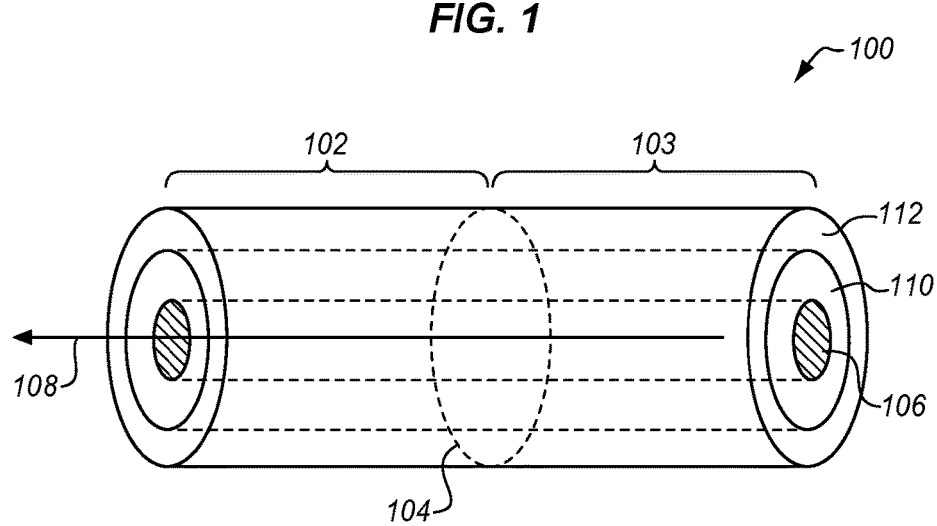
FIG. 1 is perspective view of an optical fiber in an illustrative embodiment.

FIG. 1 is a perspective view of an optical fiber 100 in an illustrative embodiment. Optical fiber 100 may comprise silica, plastic, or some combination of silica and plastic. Further, portions of optical fiber 100 may be doped to modify a refractive index of different portions of optical fiber 100. Doping portions of optical fiber 100 allows for the control of the transmissive properties of optical fiber 100.

In this embodiment, optical fiber 100 has a first length 102 and a second length 103 that are joined together at a splice 104. Optical fiber 100 includes a core 106 that conveys light 108. For example, light 108 may comprise an optical signal in some embodiments. When light 108 comprises an optical signal, light 108 encodes data. The data may be encoded using intensity modulation, phase modulation, polarization modulation, and/or frequency modulation of light 108, or some combination of intensity modulation, phase modulation, polarization modulation, and/or frequency modulation of light 108. Light may have a free space wavelength of between 1500 and 1600 nanometers.

In this embodiment, optical fiber 100 includes an inner cladding 110 that surrounds core 106 and is optically transparent. Optical fiber 100 further includes an outer cladding 112 that surrounds inner cladding 110. Outer cladding 112 in this embodiment is configured to redirect scattered light (not shown in this view) emitted by core 106 back into inner cladding 110. For example, outer cladding 112 may have a lower index of refraction than inner cladding 110, which will redirect scattered light emitted by core 106 back into inner cladding 110.

Figure 2:
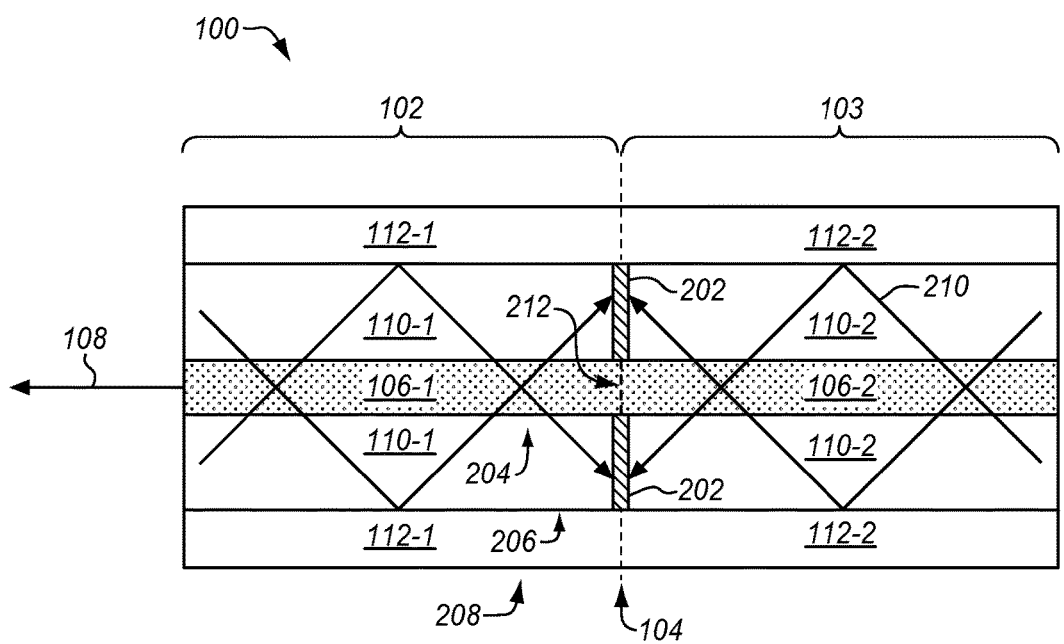
FIG. 2 is a cross-section of the optical fiber of FIG. 1 in an illustrative embodiment.

FIG. 2 is a cross-section of optical fiber 100 in an illustrative embodiment. As illustrated in FIG. 2, a PV cell 202 is located at splice 104 between first length 102 and second length 103. PV cell 202 comprises any component, system, or device that is capable of converting light into electricity. PV cell 202 may be referred to as a photon converter in some embodiments. In the embodiments described herein, PV cell 202 does not obscure, obstruct, or interfere with light 108 travelling through core 106 of optical fiber 100. For example, PV cell 202 may extend outward from an outer circumference 204 of core 106 to an outer circumference 206 of inner cladding 110, as illustrated in FIG. 2. However, PV cell 202 may extend outward from outer circumference 204 of core 106 to an outer circumference 208 of outer cladding 112 in other embodiments. In some embodiments, PV cell 202 may extend outward from outer circumference 204 of core 106 to a position that is partway to outer circumference 206 of inner cladding 110 or partway to outer circumference 208 of outer cladding 112. In this embodiment, PV cell 202 includes a void 212 that allows light 108 to traverse through core 106 across splice 104.

In the embodiments described herein, PV cell 202 is capable of converting scattered light 210 emitted by core 106 into electricity. This electricity may be used in a number of different ways. For example, PV cell 202 may power an optical amplifier (not shown in this view), which may be used to amplify light 108.

In the embodiment depicted in FIG. 2, PV cell 202 is sandwiched between an inner cladding 110-1 of first length 102 and an inner cladding 110-2 of second length 103 at splice 104. In this case, PV cell 202 blocks scattered light 210 from traversing across splice 104. Further, outer cladding 112-1 of first length 102 and outer cladding 112-2 of second length 103 are joined at splice 104 in this embodiment, but in other embodiments outer cladding 112-1 of first length 102 and outer cladding 112-2 of second length 103 may not be joined at splice 104 if PV cell 202 extends towards outer circumference 208 of outer cladding 112. In both embodiments, core 106-1 of first length 102 is joined to core 106-2 of second length 103 at splice 104 and traverses through void 212 of PV cell 202. This allows light 108 to traverse across splice 104. For instance, splice 104 may comprise a fusion splice or a mechanical fiber splice. Generally, a mechanical fiber splice may be preferred due to the high temperatures generated in a fusion splice, which may damage PV cell 202.

Figure 3:
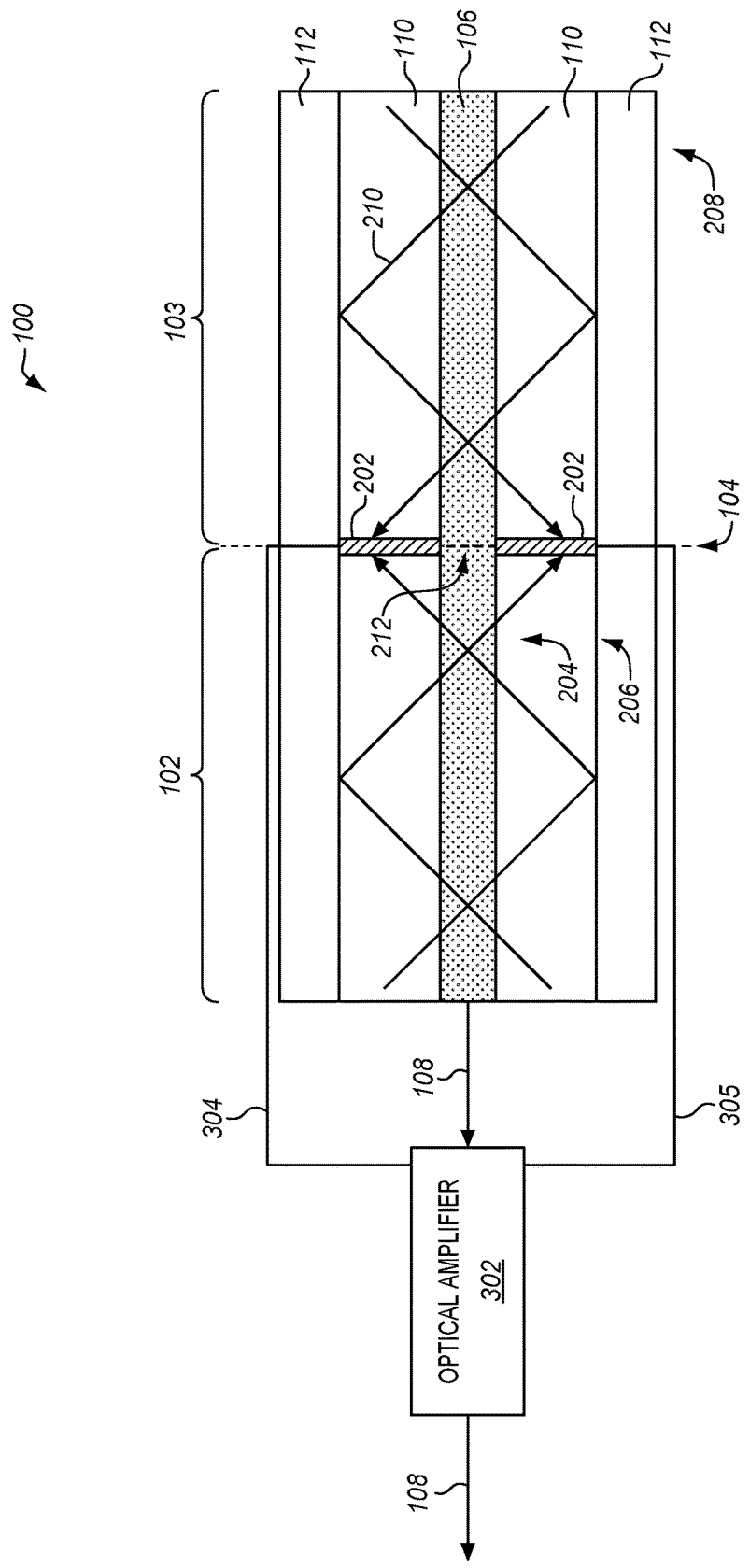
FIG. 3 is a cross-section of the optical fiber of FIG. 1 coupled to an optical amplifier in an illustrative embodiment.

FIG. 3 is a cross-section of optical fiber 100 coupled to an optical amplifier 302 in an illustrative embodiment. In this embodiment, light 108 is optically amplified by optical amplifier 302. Electrical leads 304-305 are electrically connected to PV cell 202, which are electrically coupled to optical amplifier 302. PV cell 202 converts scattered light 210 into electricity, which is used to electrically power optical amplifier 302. For instance, optical amplifier 302 may include one or more laser diodes that optically pump an active optic fiber (e.g., an optic fiber that includes an Erbium doped core). However, optical amplifier 302 may utilize other mechanisms that operate to amplify light 108.

In embodiments whereby PV cell 202 powers optical amplifier 302, the configuration of PV cell 202 and optical amplifier 302 illustrated in FIG. 3 may be placed at any position along a length of optical fiber 100. For example, PV cell 202 and optical amplifier 302 may be place at intervals along a length of optical fiber 100, and operate to boost light 108 along optical fiber 100.

Although optical amplifier 302 has been illustrated as separate from optical fiber 100 in FIG. 3, all or portions of optical amplifier 302 may be included as part of optical fiber 100. For example, first length 102 or second length 103 may include an Erbium core, which may operate to amplify light 108 when pumped by laser diodes. Such laser diodes may be included proximate to or within optical fiber 100, thereby providing a mechanism for amplifying light 108. In this case, a single protective housing (e.g., a protective outer layer of optical fiber 100) could be used to protect both optical amplifier 302 and electrical leads 304-305.

As discussed previously, dopants may be added to silica to allow optical fiber 100 to operate as an optical waveguide. For instance, core 106 may be doped with Germanium, phosphorus, or aluminum to increase the refractive index of core 106 relative to un-doped silica, while inner cladding 110 may comprise un-doped silica. This effectively provides inner cladding 110 with a refractive index which is lower than core 106. In continuing with the example, outer cladding 112 may be doped with fluorine or boron trioxide, which reduces the refractive index of outer cladding 112. This effectively provides outer cladding 112 with a refractive index which is lower than un-doped silica, and consequentially, outer cladding 112 has a refractive index which is lower than inner cladding 110. The net effect is that scattered light 210 from core 106 is redirected by outer cladding 112 back into inner cladding 110. In other embodiments, core 106 may be un-doped and inner cladding 110 and/or outer cladding 112 may be doped with fluorine. This type of optical fiber is referred to as a "pure silica core" optical fiber.

Figure 4:
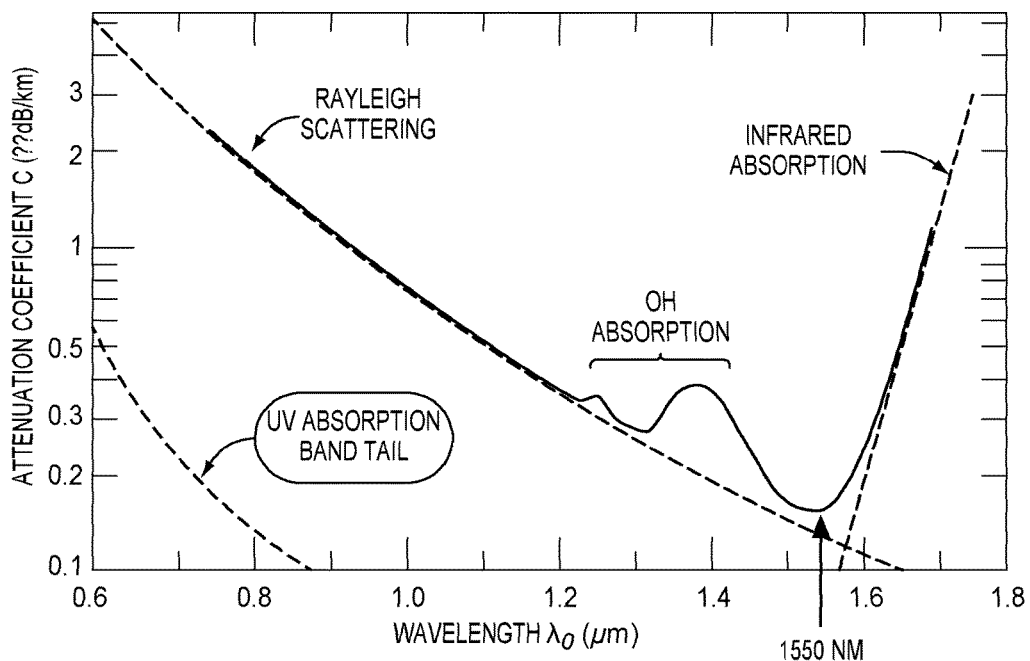
FIG. 4 is a graph of the attenuation coefficient versus wavelength for silica in the prior art.

FIG. 4 is a graph of the attenuation coefficient versus wavelength for silica in the prior art. FIG. 4 illustrates why wavelengths of 1550 nm are desirable in optical fibers that utilize silica. In particular, the attenuation coefficient at 1550 nm is much lower than at other wavelengths. For example, the attenuation coefficient at a wavelength of 1550 nm may be as much as five times lower than at a wavelength of 980 nm, which is the typical wavelength used to pump ROPAs. Since scattered light 210 has the same wavelength as light 108, the use of 1550 nm wavelengths for optical communications over optical fiber 100 (e.g., when core 106 comprises silica) ensures that scattered light 210 is attenuated much less than the typical 980 nm pump light used in ROPAs.

In some embodiments, PV cell 202 may be formed from one or more films of Gallium-Indium Arsenide (GaInAs). In particular, PV cell 202 may be formed from $Ga_{0.47}In_{0.53}As$, which exhibits an external quantum efficiency of greater than 80% at a wavelength of 1550 nm. As scattered light 210 is at the same wavelength as light 108, the use of $Ga_{0.47}In_{0.53}As$ allows PV cell 202 to efficiently convert photons at 1550 nm into electricity when light 108 operates at a wavelength of 1550 nm.

Figure 5:
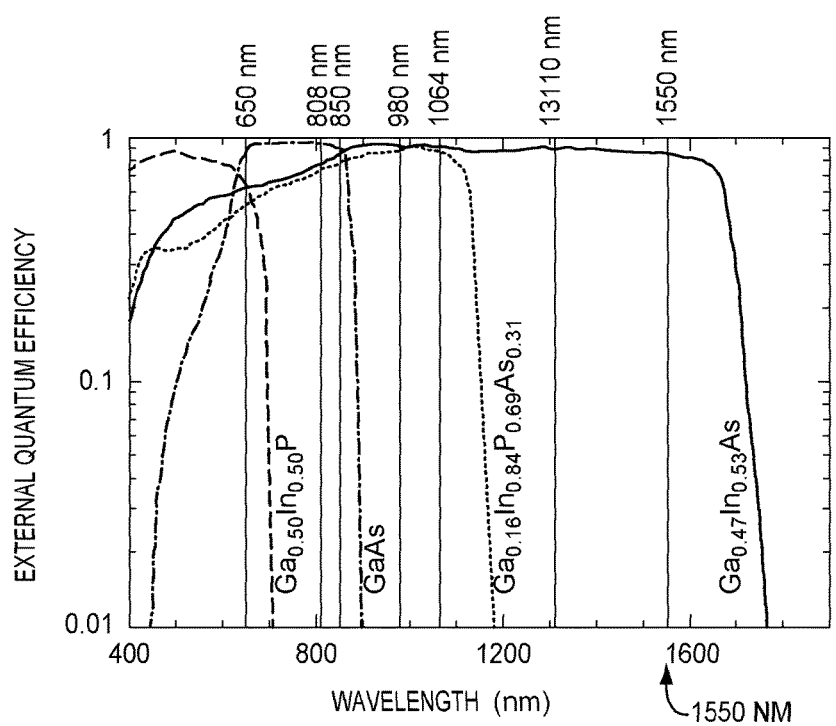
FIG. 5 is a graph of the external quantum efficiency versus wavelength for various GaInAs Photovoltaic cells in the prior art.

FIG. 5 is a graph of the external quantum efficiency versus wavelength for various GaInAs Photovoltaic cells in the prior art. In particular, FIG. 5 illustrates the external quantum efficiency of $Ga_{0.47}In_{0.53}As$ when used as a Photovoltaic cell is nearly flat from 1200 nm to 1700 nm. This makes $Ga_{0.47}In_{0.53}As$ an ideal material for PV cell 202 when light 108 operates at a wavelength of 1550 nm.

Figure 6:
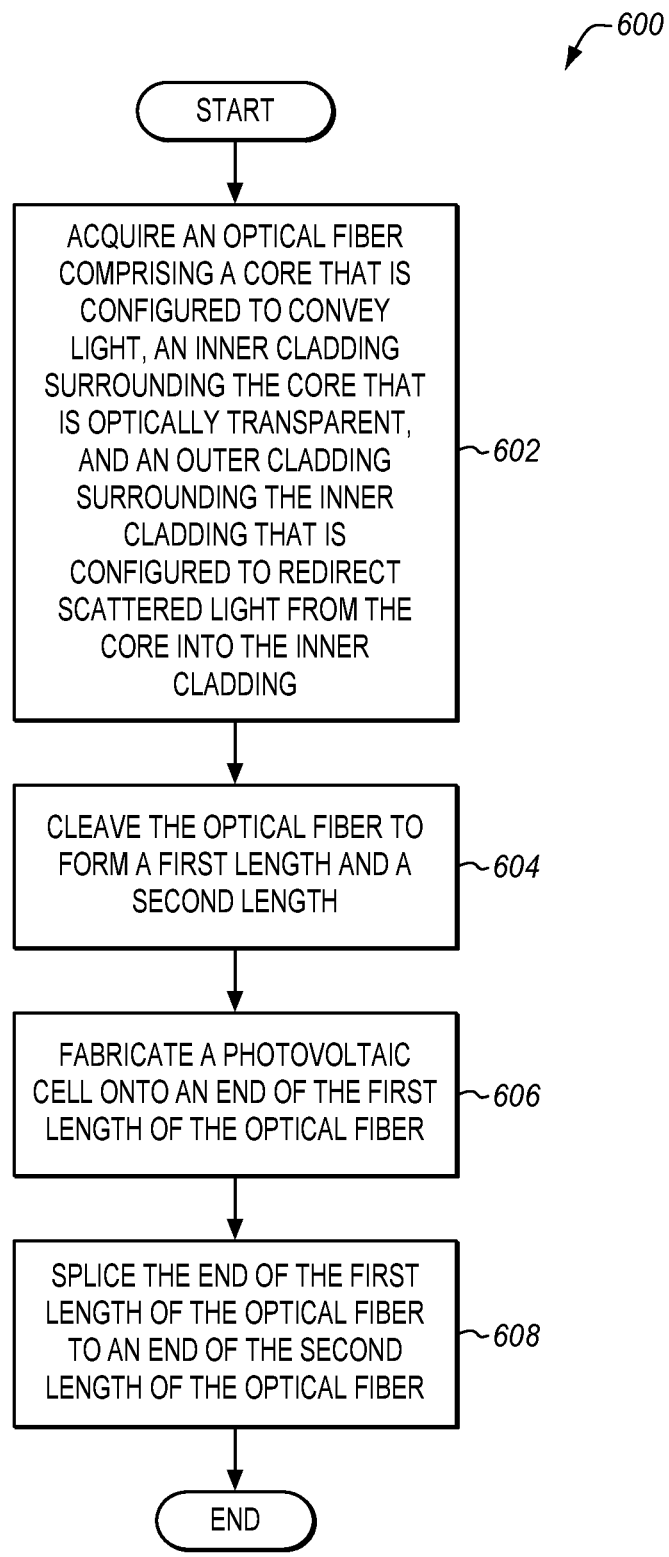
FIG. 6 is a flow chart of a method of integrating a Photovoltaic cell within an optical fiber in an illustrative embodiment.

FIG. 6 is a flow chart of a method 600 of integrating a Photovoltaic cell within an optical fiber in an illustrative embodiment. The steps of method 600 will be described with respect to optical fiber 100 and PV cell 202; although one skilled in the art will understand that method 600 may be applicable to other implementations of optical fibers and PV cells. The steps of method 600 are not all inclusive and may include other steps not shown. Further, the steps of method 600 may be performed in an alternate order.

Figure 7:
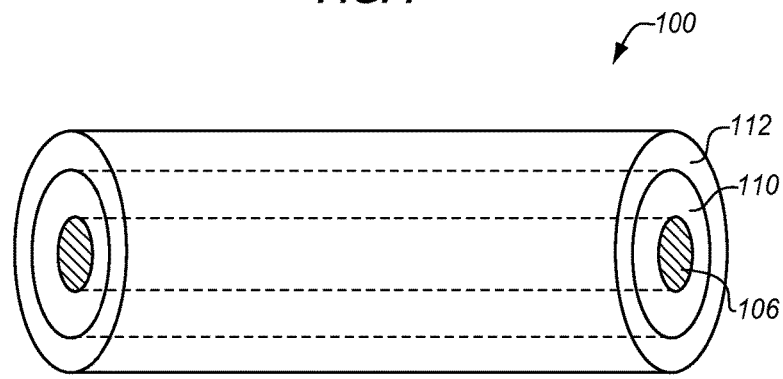
FIGS. 7-9 illustrate the results of performing steps of the method of FIG. 6 in an illustrative embodiment.
Figure 8:
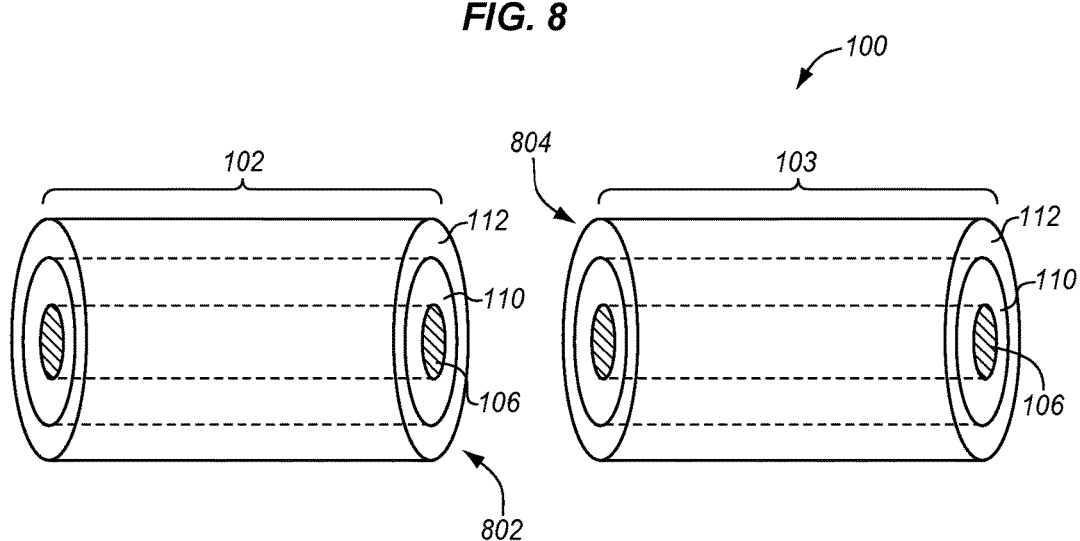

Step 602 comprises acquiring optical fiber 100, which is illustrated in FIG. 7. As discussed previously, optical fiber 100 may have a particular refractive index profile to channel scattered light 210 through inner cladding 110. Subsequent to acquiring optical fiber 100, optical fiber 100 is cleaved to form first length 102 and second length 103 (see step 604 and FIG. 8). The purpose of cleaving optical fiber 100 is to provide a flat end face that is perpendicular to the longitudinal axis of optical fiber 100.

Figure 9:
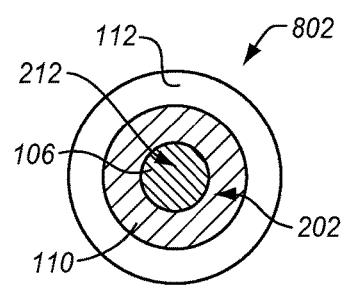

After cleaving optical fiber 100, PV cell 202 is fabricated onto an end 802 of first length 102 of optical fiber 100 (see step 606 and FIG. 9). Fabricating PV cell 202 onto end 802 may be performed in a number of different ways. For example, PV cell 202 may be formed onto end 802 using a deposition process. This will be described later. In another example, PV cell 202 may be fabricated separately and bonded to end 802. In some cases, end 802 is polished after cleaving to ensure that a high-quality surface is present at end 802 prior to forming and/or bonding PV cell 202 to end 802. After fabricating PV cell 202 onto end 802, end 802 of first length 102 of optical fiber 100 is spliced to an end 804 of second length 103 of optical fiber 100 (see step 606, FIG. 8, and FIG. 2).

Figure 10:
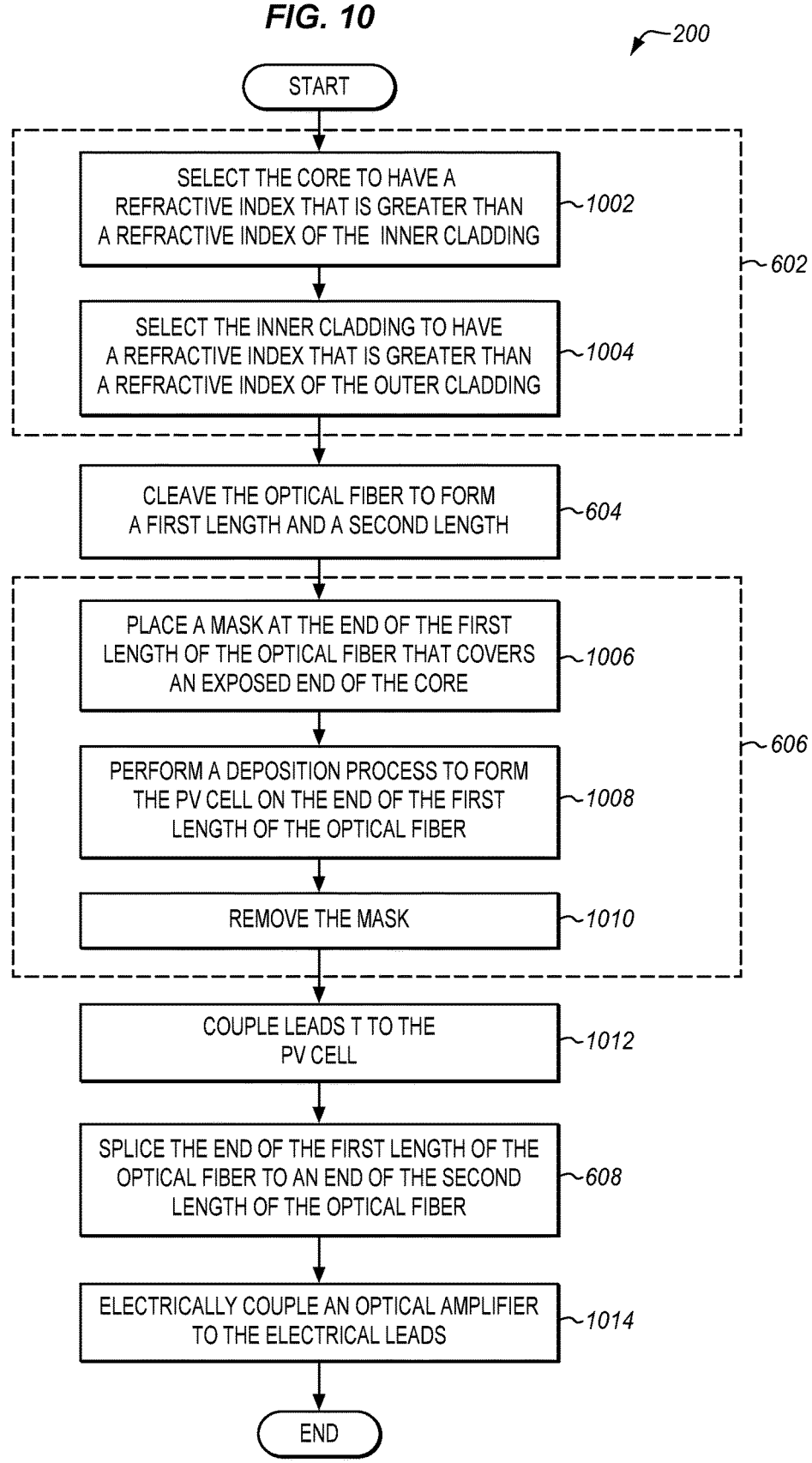
FIG. 10 illustrates additional steps of the method of FIG. 6 in an illustrative embodiment.

FIG. 10 illustrates additional steps of method 600 in an illustrative embodiment. Core 106 of optical fiber 100 is selected to have a refractive index that is greater than a refractive index of inner cladding 110 (see step 1002). For example, core 106 may comprise silica doped with $GeO_2$ or $Al_2O_3$. Inner cladding 110 is selected to have a refractive index that is greater than a refractive index of outer cladding 112 (see step 1004). For instance, inner cladding 110 may be un-doped silica, while outer cladding 112 may comprise silica doped with fluorine or $B_2O_3$.

Figure 11:
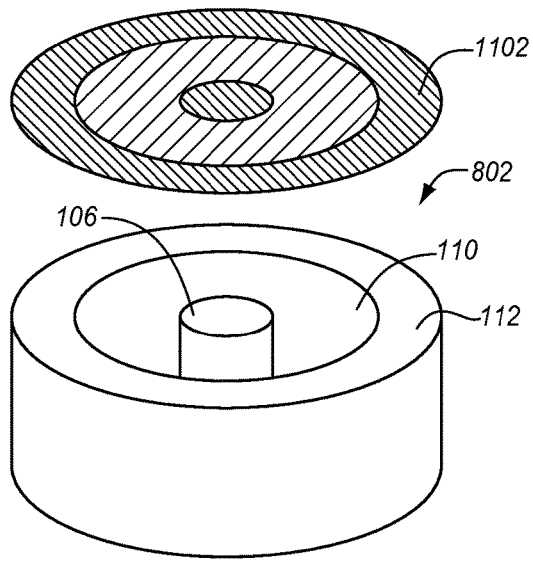
FIGS. 11-15 illustrate the results of performing steps of the method of FIG. 10 in an illustrative embodiment.

Optical fiber 100 is cleaved to form first length 102 and second length 103, previously described (see step 604). To fabricate PV cell 202, a mask 1102 is placed at end 802 of first length 102 of optical fiber 100 (see step 1006 and FIG. 11). Mask 1102 prevents a subsequent deposition process from covering core 106.

Figure 12:
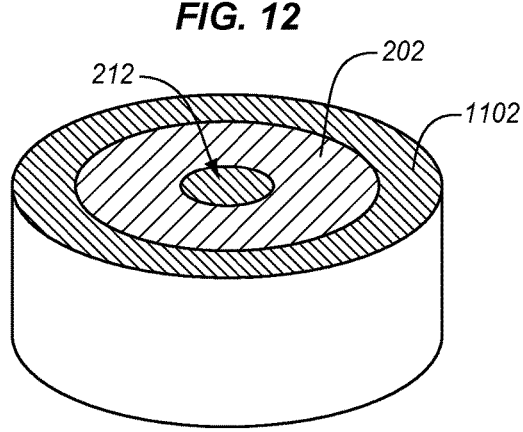
Figure 13:
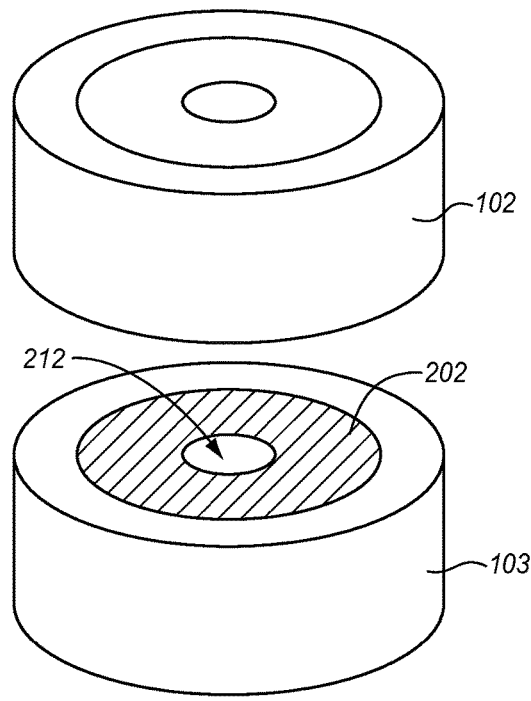

To continue fabricating PV cell 202, a deposition process is performed to form PV cell 202 on end 802 (see step 1008 and FIG. 12). For example, GaInAs may be deposited on end 802 to form one or more films (e.g., one or more layers of $Ga_{0.47}In_{0.53}As$). Mask 1102 is removed (see step 1010 and FIG. 13).

Figure 14:
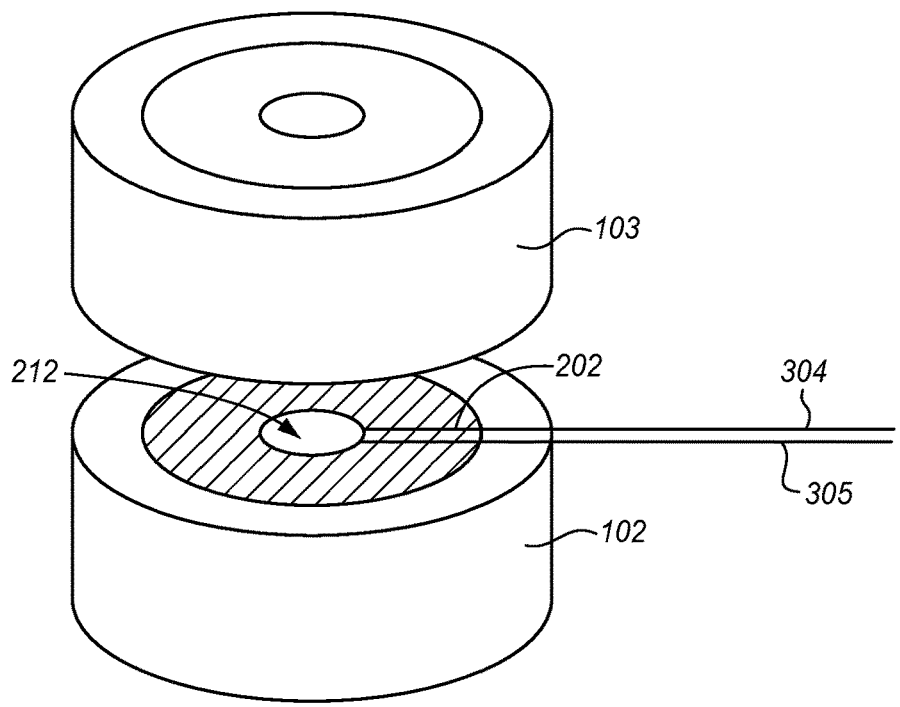
Figure 15:
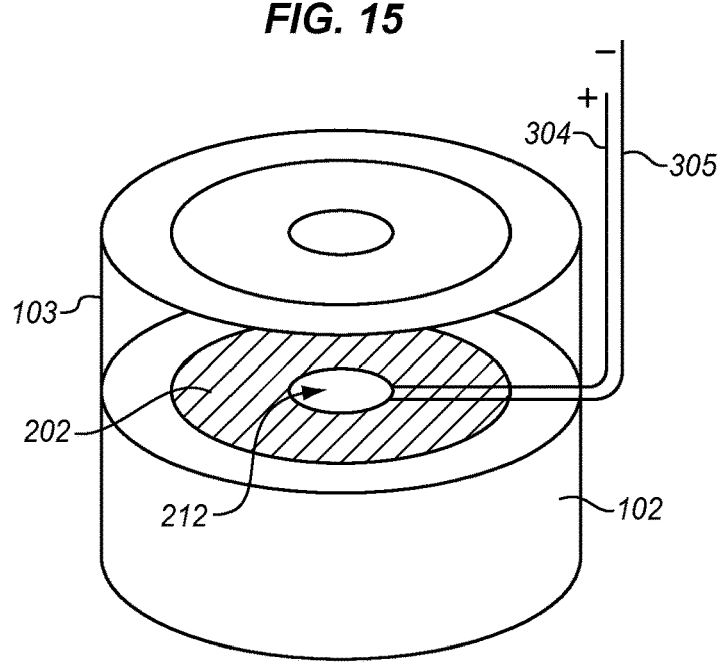

Electrical leads 304-305 are electrically coupled to PV cell 202 (see step 1012 and FIG. 14). First length 102 and second length 103 of optical fiber 100 are spliced together (see step 608 and FIG. 15, previously described). Electrical leads 304-305 are electrically coupled to optical amplifier 302 (see step 1014 and FIG. 3).

The use of PV cell 202 within optical fiber 100 allows for remotely powering an optical amplifier without the drawbacks associated with ROPAs, which suffer from attenuation issues which precludes their use at long distances from an end of an optical fiber. Optical fiber 100 utilizes two claddings that channel scattered light 210 and provides scattered light 210 to PV cell 202, which would otherwise be lost to absorption by a protective shell that surrounds typical optical fibers. The use of PV cell 202 within optical fiber 100 is therefore uniquely suited to provide remote power options along optical fibers, such as those described with respect to powering remote optical amplifiers.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. An apparatus, comprising:
an optical fiber having a first length and a second length joined together at a splice, the optical fiber including:
a core that is configured to convey light;
an inner cladding surrounding the core that is optically transparent; and
an outer cladding surrounding the inner cladding that is configured to redirect scattered light from the core into the inner cladding; and
a Photovoltaic (PV) cell disposed at the splice between the first length and the second length of the optical fiber that includes a void that allows the light through the core to traverse across the splice.

2. The apparatus of claim 1, wherein:
the PV cell is disposed between an outer circumference of the core and an outer circumference of the inner cladding.

3. The apparatus of claim 1, wherein:
the PV cell includes electrical leads that extend from the optical fiber at the splice; and
the PV cell is configured to convert the scattered light received by the PV cell into electricity for transport by the electrical leads.

4. The apparatus of claim 3, further comprising:
an optical amplifier electrically coupled to the electrical leads and powered by the PV cell that is configured to receive the light from the core, and to optically amplify the light.

5. The apparatus of claim 1, wherein:
a refractive index of the core is greater than a refractive index of the inner cladding; and
a refractive index of the inner cladding is greater than a refractive index of the outer cladding.

6. The apparatus of claim 1, wherein:
the light has a free space wavelength of between 1500 nanometers and 1600 nanometers.

7. The apparatus of claim 1, wherein:
the splice comprises a mechanical fiber splice.

8. The apparatus of claim 1, wherein:
the PV cell is formed from Gallium-Indium Arsenide (GaInAs).

9. The apparatus of claim 8, wherein:
the PV cell is formed from $Ga_{0.47}In_{0.53}As$.

10. The apparatus of claim 1, wherein:
the light transmits data.

11. An apparatus, comprising:
a first length of an optical fiber having a first core that is configured to convey light, a first inner cladding surrounding the first core that is optically transparent, and a first outer cladding surrounding the first inner cladding that is configured to redirect scattered light from the first core into the first inner cladding;
a second length of the optical fiber having a second core that is configured to convey the light, a second inner cladding surrounding the second core that is optically transparent, and a second outer cladding surrounding the second inner cladding that is configured to redirect the scattered light from the second core into the second inner cladding, wherein the first core and the second core are joined together at a splice; and
a photon converter sandwiched between the first inner cladding and the second inner cladding at the splice that is configured to convert the scattered light into electricity, and to allow the light from the first core to traverse across the splice to the second core.

12. The apparatus of claim 11, further comprising:
electrical leads that extend from the photon converter outside of the optical fiber at the splice; and
an optical amplifier electrically coupled to the electrical leads and powered by the photon converter that is configured to receive the light from the first and second core, and to optically amplify the light.

13. The apparatus of claim 11, wherein:
a refractive index of the first and second core is greater than a refractive index of the first and second inner cladding; and
a refractive index of the first and second outer cladding is greater than a refractive index of the first and second inner cladding.

14. The apparatus of claim 11, wherein:
the light has a free space wavelength of between 1500 nanometers and 1600 nanometers.

15. The apparatus of claim 11, wherein:
the splice comprises a mechanical fiber splice.

16. The apparatus of claim 11, wherein:
the photon converter comprises a PV cell formed from Gallium-Indium Arsenide (GaInAs).

17. The apparatus of claim 16, wherein:
the PV cell is formed from $Ga_{0.47}In_{0.53}As$.

18. The apparatus of claim 11, wherein:
the light transmits data.

* * * * *